US010395620B2

(12) United States Patent
Lyngnes et al.

(10) Patent No.: US 10,395,620 B2
(45) Date of Patent: Aug. 27, 2019

(54) ELECTRONIC DEVICES HAVING AMBIENT LIGHT SENSORS WITH LIGHT COLLIMATORS

(71) Applicant: Apple Inc., Cupertino, CA (US)

(72) Inventors: Ove Lyngnes, Carmel Valley, CA (US); Tingjun Xu, San Jose, CA (US); Avery P. Yuen, San Jose, CA (US); Christopher M. Dodson, Santa Clara, CA (US); Tianbo Sun, Sunnyvale, CA (US); Xianwei Zhao, Fremont, CA (US); Xingxing Cai, Santa Clara, CA (US); Sunggu Kang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/713,308

(22) Filed: Sep. 22, 2017

(65) Prior Publication Data

US 2019/0096364 A1 Mar. 28, 2019

(51) Int. Cl.
*G09G 5/10* (2006.01)
*G02B 27/30* (2006.01)
*G02B 5/02* (2006.01)

(52) U.S. Cl.
CPC ............. *G09G 5/10* (2013.01); *G02B 5/0221* (2013.01); *G02B 5/0242* (2013.01); *G02B 27/30* (2013.01); *G09G 2320/0626* (2013.01); *G09G 2360/144* (2013.01)

(58) Field of Classification Search
CPC ............. G09G 5/10; G09G 2320/0626; G09G 2360/144; G02B 5/0221; G02B 5/0242; G02B 27/30
See application file for complete search history.

(56) References Cited

U.S. PATENT DOCUMENTS 7,072,096 B2 7/2006 Holman et al.
8,469,575 B2 6/2013 Weber et al.
8,482,698 B2 7/2013 Atkins
9,551,783 B2 1/2017 Schneider et al.
(Continued)

OTHER PUBLICATIONS

Byung-Yun Joo and Dong-Ho Shin, "Design Guidance of Backlight Optic for Improvement of the Brightness in the Conventional Edge-lit LCD Backlight", Displays Journal, (Feb. 12, 2010), pp. 87-92, vol. 31.

*Primary Examiner* — Lisa S Landis
(74) *Attorney, Agent, or Firm* — Treyz Law Group, P.C.; G. Victor Treyz; David K. Cole

(57) ABSTRACT

An electronic device may be provided with a display. The display may have an array of pixels that form an active area and may have an inactive area that runs along an edge of the active area. An opaque layer may be formed on an inner surface of a display cover layer in the inactive area of the display or may be formed on another transparent layer in the electronic device. An ambient light sensor window may be formed from the opening and may be aligned with color ambient light sensor. The ambient light sensor may have an integrated circuit with photodetectors. Ambient light passing through the ambient light sensor window may be diffused by a light diffuser having one or more light-diffusing layers. Diffused ambient light may be collimated using a light collimator having one or more light-collimating layers such as layers with inwardly facing protrusions.

21 Claims, 10 Drawing Sheets

(56) References Cited

U.S. PATENT DOCUMENTS

| | | | | |
|---|---|---|---|---|
| 2015/0102212 | A1 | 4/2015 | Ruh | |
| 2016/0232828 | A1 | 8/2016 | Jia et al. | |
| 2016/0254312 | A1* | 9/2016 | Lee | G06K 9/0004 382/125 |
| 2016/0282541 | A1 | 9/2016 | Shi et al. | |
| 2017/0220844 | A1* | 8/2017 | Jones | G06K 9/0053 |

* cited by examiner

ELECTRONIC DEVICES HAVING AMBIENT LIGHT SENSORS WITH LIGHT COLLIMATORS

FIELD

This relates generally to electronic devices, and, more particularly, to electronic devices with light sensors.

BACKGROUND

Electronic devices such as laptop computers, cellular telephones, and other equipment are sometimes provided with optical components such as light sensors. Light sensors such as ambient light sensors may be used to make measurements on ambient lighting conditions. For example, an ambient light sensor may measure ambient light intensity so that display brightness adjustments may be made to a display in an electronic device.

To reduce ambient light sensor sensitivity to the presence of directional light sources such as lamps in the user's ambient environment, ambient light sensors may be provided with light diffusers. A light diffuser may diffuse incoming ambient light before the ambient light is measured by a photodetector associated with the ambient light sensor. Light diffuser structures may help reduce the sensitivity of an ambient light sensor to sources of directional lighting, but may scatter incoming light away from a photodetector in the ambient light sensor, thereby reducing ambient light sensor sensitivity.

SUMMARY

An electronic device may be provided with a display. The display may have an array of pixels that form an active area and may have an inactive area that runs along an edge of the active area. An opaque layer may be formed on an inner surface of a display cover layer in the inactive area of the display or may be formed on another transparent layer in the electronic device. An ambient light sensor window may be formed from the opening and may be aligned with color ambient light sensor.

The ambient light sensor may have an integrated circuit with photodetectors. A color filter layer may overlap the photodetectors and may be used to provide the photodetectors with the ability to sense different colors of light.

Ambient light passing through the ambient light sensor window may be diffused by a light diffuser having one or more light-diffusing layers. The light-diffusing layers may include light-scattering particles embedded in materials such as polymers and/or may include textured light-scattering surface structures.

Diffused ambient light may be collimated using a light collimator. The light collimator may be interposed between the photodetectors and the light-diffusing layers. The light-collimator may have one or more light-collimating layers. Each light-collimating layer may include a textured light collimating pattern such as inwardly facing protrusions.

If desired, an infrared-light-blocking filter may be interposed between the light-collimating layer(s) and the photodetectors.

DETAILED DESCRIPTION

Electronic devices may be provided with optical components. The optical components may include light sensing components such as ambient light sensors.

Figure 1:
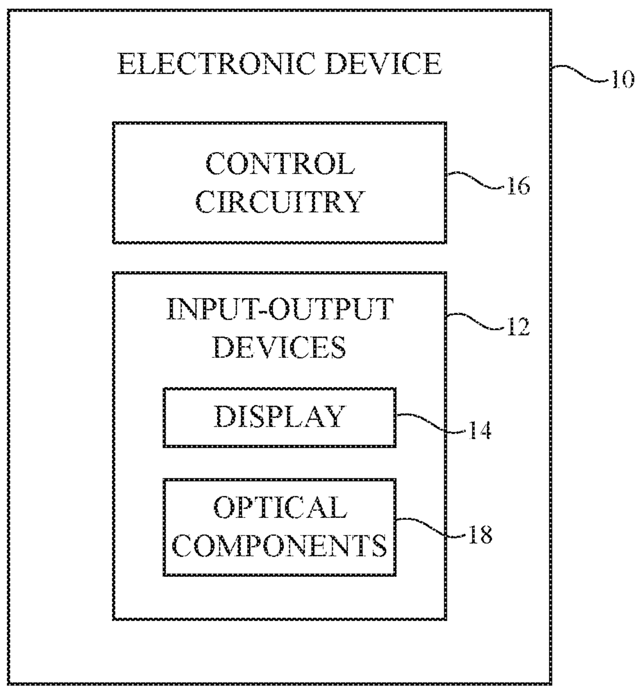
FIG. 1 is a schematic diagram of an illustrative electronic device having optical components such as an ambient light sensor in accordance with an embodiment.

An illustrative electronic device of the type that may be provided with an ambient light sensor is shown in FIG. 1. Electronic device 10 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment.

As shown in FIG. 1, electronic device 10 may have control circuitry 16. Control circuitry 16 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 16 may be used to control the operation of device 10. The processing circuitry may be based on one or more microprocessors, microcontrollers, digital signal processors, baseband processors, power management units, audio chips, application specific integrated circuits, etc.

Device 10 may have input-output circuitry such as input-output devices 12. Input-output devices 12 may include user input devices that gather user input and output components that provide a user with output. Devices 12 may also include communications circuitry that receives data for device 10 and that supplies data from device 10 to external devices and may include sensors that gather information from the environment.

Input-output devices 12 may include one or more displays such as display 14. Display 14 may be a touch screen display that includes a touch sensor for gathering touch input from a user or display 14 may be insensitive to touch. A touch sensor for display 14 may be based on an array of capacitive touch sensor electrodes, acoustic touch sensor structures, resistive touch components, force-based touch sensor structures, a light-based touch sensor, or other suitable touch sensor arrangements. Display 14 may be a liquid crystal display, a light-emitting diode display (e.g., an organic light-emitting diode display), an electrophoretic display, or other display.

Input-output devices 12 may include optical components 18. Optical components 18 may include ambient light sensors (e.g., color ambient light sensors configured to measure ambient light color and intensity by making light measurements with multiple light detector channels each of which has a corresponding color filter and photodetector to measure light in a different wavelength band), optical proximity sensors (e.g., sensors with a light-emitting device such as an infrared light-emitting diode and a corresponding light detector such as an infrared photodiode for detecting when an external object that is illuminated by infrared light from the light-emitting diode is in the vicinity of device 10), a visible light camera, an infrared light camera, light-emitting diodes that emit flash illumination for visible light cameras, infrared light-emitting diodes that emit illumination for infrared cameras, and/or other optical components.

In addition to optical components 18, input-output devices 12 may include buttons, joysticks, scrolling wheels, touch pads, key pads, keyboards, microphones, speakers, tone generators, vibrators, cameras, light-emitting diodes and other status indicators, non-optical sensors (e.g., temperature sensors, microphones, capacitive touch sensors, force sensors, gas sensors, pressure sensors, sensors that monitor device orientation and motion such as inertial measurement units formed from accelerometers, compasses, and/or gyroscopes), data ports, etc. A user can control the operation of device 10 by supplying commands through input-output devices 12 and may receive status information and other output from device 10 using the output resources of input-output devices 12.

Figure 2:
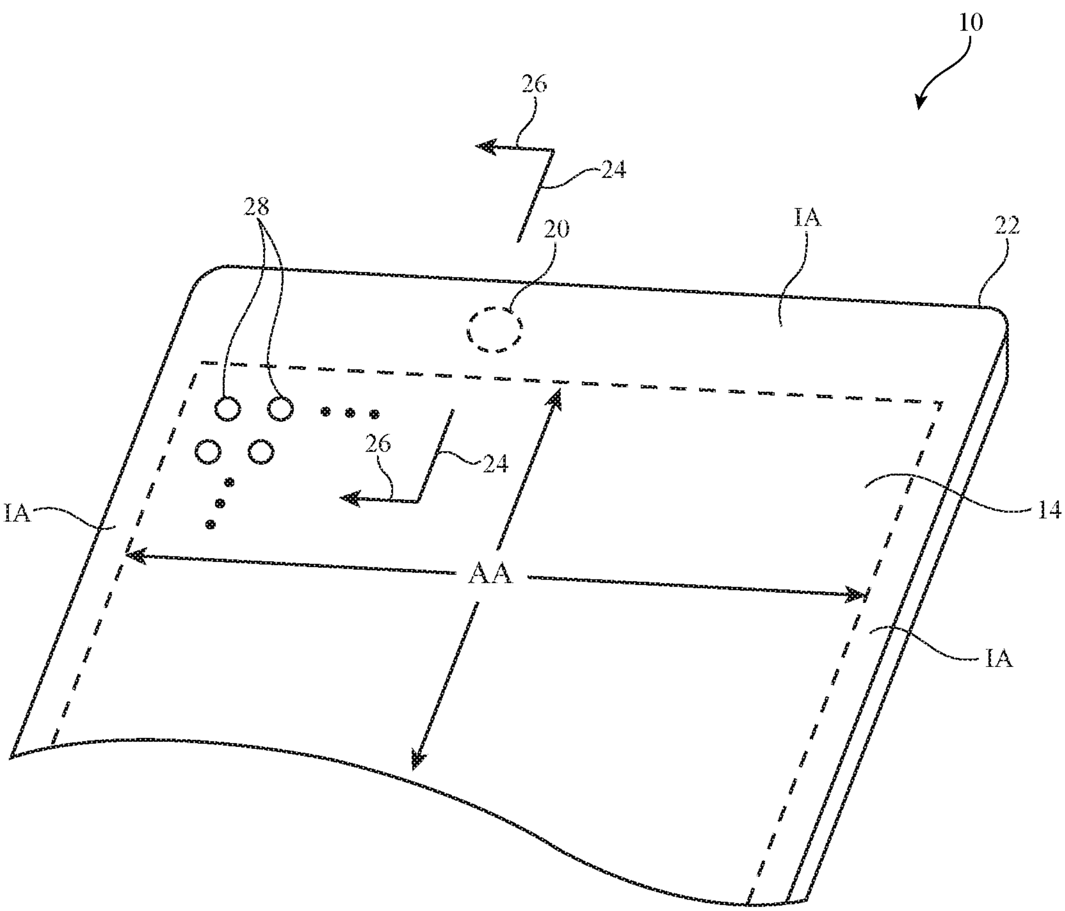
FIG. 2 is a perspective view of a portion of an electronic device display having an optical component window overlapping an optical component such as an ambient light sensor in accordance with an embodiment.

Device 10 may have a housing. The housing may form a laptop computer enclosure, an enclosure for a wristwatch, a cellular telephone enclosure, a tablet computer enclosure, or other suitable device enclosure. A perspective view of a portion of an illustrative electronic device is shown in FIG. 2. In the example of FIG. 2, device 10 includes a display such as display 14 mounted in housing 22. Housing 22, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 22 may be formed using a unibody configuration in which some or all of housing 22 is machined or molded as a single structure or may be formed using multiple structures (e.g., an internal frame structure, one or more structures that form exterior housing surfaces, etc.).

Display 14 may be protected using a display cover layer such as a layer of transparent glass, clear plastic, sapphire, or other clear layer (e.g., a transparent planar member that forms some or all of a front face of device 10 or that is mounted in other portions of device 10). Openings may be formed in the display cover layer. For example, an opening may be formed in the display cover layer to accommodate a button, a speaker port, or other components. Openings may be formed in housing 22 to form communications ports (e.g., an audio jack port, a digital data port, etc.), to form openings for buttons, etc. In some configurations, housing 22 may have a rear housing wall formed from a planar glass member or other transparent layer (e.g., a planar member formed on a rear face of device 10 opposing a front face of device 10 that includes a display cover layer). The planar member forming the rear housing wall may have an interior surface that is coated with an opaque masking layer.

Display 14 may have an array of pixels 28 in active area AA (e.g., liquid crystal display pixels, organic light-emitting diode pixels, electrophoretic display pixels, etc.). Pixels 28 of active area AA may display images for a user of device 10. Active area AA may be rectangular or may have other suitable shapes.

Inactive portions of display 14 such as inactive border area IA may be formed along one or more edges of active area AA. Inactive border area IA may overlap circuits, signal lines, and other structures that do not emit light for forming images. To hide inactive circuitry and other components in border area IA from view by a user of device 10, the underside of the outermost layer of display 14 (e.g., the display cover layer or other display layer) may be coated with an opaque masking material such as a layer of black ink (e.g., polymer containing black dye and/or black pigment, opaque materials of other colors, etc.) and/or other layers (e.g., metal, dielectric, semiconductor, etc.). Opaque masking materials such as these may also be formed on an inner surface of a planar rear housing wall formed from glass, ceramic, polymer, crystalline transparent materials such as sapphire, or other transparent material.

Optical components (e.g., a camera, a light-based proximity sensor, an ambient light sensor, status indicator light-emitting diodes, camera flash light-emitting diodes, etc.) may be mounted under one or more optical component windows such as optical component window 20 of FIG. 2. In the example of FIG. 2, optical component window 20 is formed in inactive area IA of display 14 (e.g., an inactive border area in a display cover layer). If desired, optical component windows such as window 20 may be formed in other portions of device 10 such as portions of a rear housing wall formed from a transparent member coated with opaque masking material. Arrangements in which optical component windows such as window 20 are formed in portions of a display cover layer for display 14 may sometimes be described herein as examples.

In an arrangement of the type shown in FIG. 2, one or more openings for one or more respective optical component windows such as optical component window 20 may be formed in the opaque masking layer of inactive area IA to accommodate the optical components. A partially transparent layer (e.g., a layer of polymer containing dye and/or pigment such as a layer of black ink) and other structures may optionally overlap the openings to adjust the appearance of the optical component windows (e.g., to adjust the appearance of the optical component windows so that the optical component windows have appearances that match the surrounding opaque masking layer).

Optical component windows may, in general, include any suitable layer(s) of material (e.g., inorganic and/or organic thin-film layers, partially transparent metal films, dielectric coating layers such as thin-film interference filter coatings formed from stacks of dielectric layers, etc.). These layers of material may be formed within an opening in a layer of opaque masking material.

Figure 3:
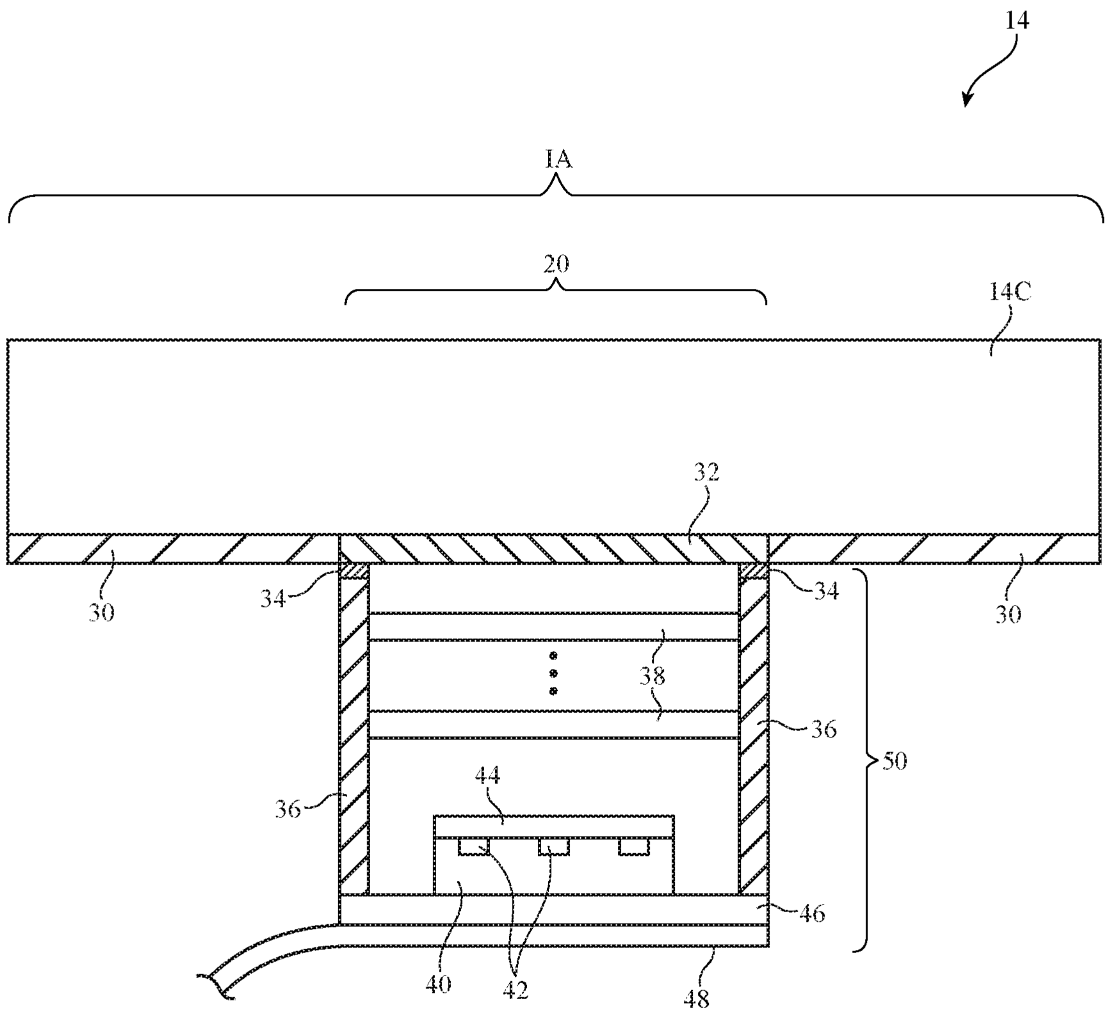
FIG. 3 is a cross-sectional side view of an illustrative optical component window overlapping an optical component such as a color ambient light sensor in accordance with an embodiment.

FIG. 3 is a cross-sectional side view of display 14 of FIG. 2 taken along line 24 through optical component window 20 and viewed in direction 26 of FIG. 2. As shown in FIG. 3, display 14 may have a display cover layer such as display cover layer 14C. Display cover layer 14C may be formed from clear glass, transparent polymer, transparent crystalline material such as sapphire, transparent ceramic, and/or other suitable transparent material. Display cover layer 14C may have a portion that covers active area AA of display 14 and a portion such as the portion shown in FIG. 3 that covers inactive area IA. Layer 14C may be formed from glass, plastic, ceramic, sapphire, or other transparent materials and may be a part of display 14 or a separate protective layer that covers active display structures.

Window 20 may be formed from an opening in opaque masking layer 30. Opaque masking layer 30 may be formed from polymer containing dye and/or pigment (e.g., black ink) and/or other opaque material on the inner surface of display cover layer 14C in inactive area IA. The opening associated with window 20 may be left free of overlapping coatings or may be covered with one or more overlapping layers such as layer 32 to adjust the outward appearance of optical component window 20. Layer(s) 32 may be, for example, a layer of polymer containing dye and/or ink having a light transmission of about 1-10%, at least 2%, at least 0.5%, at least 1.5%, less than 7%, less than 5%, less than 3%, etc. If desired, optical component windows may be formed in housing walls and/or other structures in device 10. The example of FIG. 3 is merely illustrative.

Any suitable optical component 18 that emits and/or detects light (e.g., an ambient light sensor, an optical proximity sensor, an image sensor, a light-emitting diode or other light source, etc.) may be aligned with window 20. As shown in FIG. 3, for example, an optical component such as color ambient light sensor 50 may be formed in alignment with optical component window 20 (sometimes referred to as an ambient light sensor window) in display 14.

Display 14 has an array of pixels overlapped by display cover layer 14C in an active area (AA) of display 14 (not shown in FIG. 3). In inactive area IA, portions of the underside of display cover layer 14C may be coated with opaque masking layer 30 (e.g., black ink, etc.) and an opening in layer 30 may be covered with optional partially transparent layers such as layer 32 to help visually match the appearance of window 20 to the visual appearance of surrounding portions of display cover layer 14C (e.g., to match the appearance of opaque masking layer 30) while still allowing ambient light sensor 50 to measure ambient light.

Color ambient light sensor 50 may include support structures such as support structure 36 (sometimes referred to as a sensor wall, a sensor body structure, a sensor housing structure, etc.). A ring or patch of adhesive such as pressure sensitive adhesive layer 34 may be used to couple support structure 36 to the underside of display cover layer 14C in alignment with optical component window 20. Support structure 36 may form walls that surround optical layers 38. Optical layers 38 may include one or more light diffuser layers (sometimes referred to as light diffusing layers) that diffuse incoming ambient light and/or may include one or more visible-light-transmitting-and-infrared-light-blocking filters (sometimes referred to as infrared-light-blocking filters or infrared-blocking filters). One or more light collimation layers may also be included in optical layers 38. The thickness of each layer 38 may be 100-200 microns, at least 15 microns, at least 50 microns, at least 100 microns, less than 250 microns, less than 300 microns, less than 600 microns, or other suitable thickness.

With one illustrative configuration, the diffuser layer(s) may be mounted between layer 32 and the infrared-blocking filter(s), so that the infrared-blocking filter(s) are between light-detector integrated circuit 40 and the light diffuser layer(s). The light collimating layer(s) may be mounted between the light diffuser layers and the infrared-blocking filter(s). If desired, other optical layers may be included in layers 38. Ambient light traveling through window 20 (e.g., through layer 14C, layer 32, and layers 38) may be detected using photodetectors 42 in light detector integrated circuit 40. Control circuitry 16 (FIG. 1) can use measurements from integrated circuit 40 to determine the color and intensity of ambient light. If desired, light guiding structures (sometimes referred to as an optical waveguide, light guide, or light pipe) may also be used in routing incoming ambient light between window 20 and photodetectors 42.

Viewed from above through layer 14C, support structure 36 may extend around the periphery of optical window 20 (e.g., with a footprint that is circular, oval, rectangular, or other suitable shape). Support structure 36 may be formed from an opaque material that blocks visible and infrared light such as black plastic and/or other opaque materials. Support structure 36 may be used to form a one-piece or a multi-piece housing for sensor 50. In the example of FIG. 3, support structure 36 is a single member having an upper region in which optical layers 38 are mounted and a lower region in which light detector integrated circuit 40 is mounted.

Light detector integrated circuit 40 may be formed from a silicon die or other semiconductor die. Wire bonds, through-silicon vias and solder joints, or other conductive paths may be used in coupling the circuitry of light detector integrated circuit 40 to contact pads on printed circuit 46. Solder joints or other electrical connections may be used to couple signal paths formed from metal traces in flexible printed circuit 48 to signal paths in printed circuit 46 (e.g., signal paths formed from metal lines in printed circuit 46 that are coupled to the circuitry of integrated circuit 40). In this way, the circuitry of light detector integrated circuit 40 may be coupled to the signal paths in flexible printed circuit 48 so that these signal paths may route signals to and from control circuitry 16.

Light detector integrated circuit 40 may include multiple photodetectors 42 (e.g., photodiodes). Each photodetector 42 may be overlapped by a respective color filter in color filter layer 44. With one illustrative configuration, the color filters are formed from colored materials (e.g., polymer containing colored dyes and/or pigments) of different respective colors (e.g., red, blue, green, etc.). The color filters each pass light in a different respective range of wavelengths (e.g., a pass band of a different desired color) to an associated overlapped photodetector 42. With another illustrative configuration, each color filter may be formed from a thin-film interference filter (e.g., a stack of thin-film dielectric layers of alternating refractive index) that selectively passes a desired range of wavelengths (e.g., a pass band of a desired color) to an associated overlapped photodetector 42.

As an example, a red-pass color filter (dye-based, pigment-based, and/or thin-film-interference-filter-based) may overlap a first photodetector 42 to form a red-light-sensing channel in ambient light sensor 50, a blue-pass color filter may overlap a second photodetector 42 to form a blue-light-sensing channel in ambient light sensor 50, etc. The color filters of layer 44 may be configured to block infrared light (e.g., stray infrared light that has not been blocked by the infrared-blocking filter(s) in optical layers 38) and/or a separate infrared-light blocking layer (e.g., an infrared-light-blocking thin-film interference filter) may be formed under or over the color filters.

Figure 4:
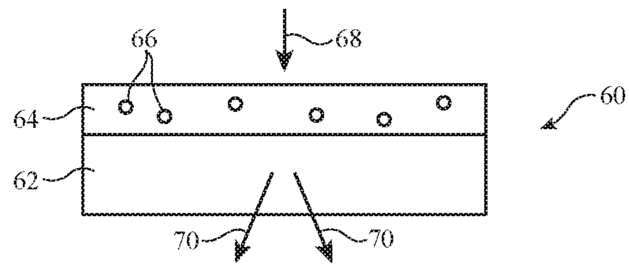
FIG. 4 is a cross-sectional side view of an illustrative light diffuser having a light diffusing coating on an outwardly facing surface of transparent substrate in accordance with an embodiment.

FIG. 4 is a cross-sectional side view of an illustrative light diffusing layer for a light diffuser in optical components 38. In the example of FIG. 4, light diffuser layer 60 has a substrate such as substrate 62 (e.g., transparent glass, transparent polymer, or other transparent material). Light-diffusing coating layer 64 is formed on the upper (outwardly facing) surface of substrate 62 and includes a polymer binder in which light-scattering particles 66 have been embedded. The polymer in which particles 66 are embedded may be a clear polymer. Particles 66 may have a refractive index that differs from the refractive index of the clear polymer. Particles 66 may be, for example, particles of titanium dioxide or other metal oxide, other inorganic dielectric particles, and/or other materials having an index of refraction that differs from the refractive index of the polymer of coating layer 64. During operation, incoming ambient light 68 is scattered by particles 66, so that transmitted diffused ambient light 70 is more diffuse than incoming ambient light 68.

Figure 5:
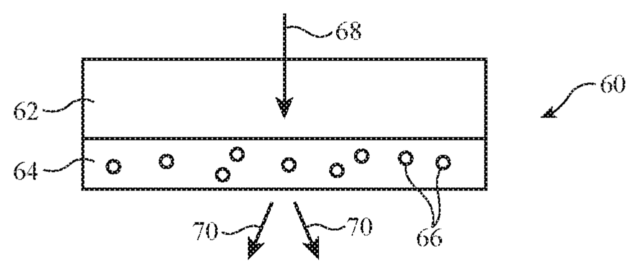
FIG. 5 is a cross-sectional side view of an illustrative light diffuser having a light diffusing coating on an inwardly facing surface of a transparent substrate in accordance with an embodiment.
Figure 6:
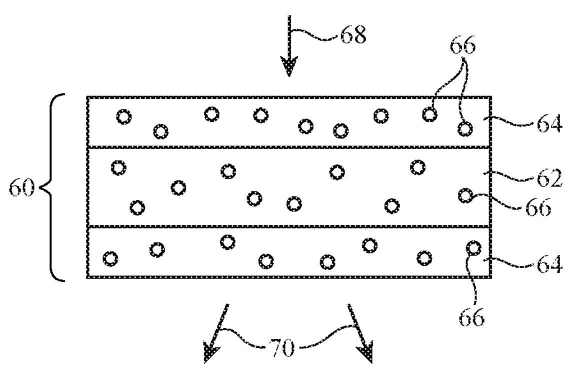
FIG. 6 is a cross-sectional side view of an illustrative light diffuser having multiple optional light diffusing coating layers and having light-scattering particles embedded in a transparent substrate layer in accordance with an embodiment.

In the illustrative configuration of FIG. 5, coating layer 64 has been formed on the lower (inwardly facing) surface of substrate 62. Configurations in which both surfaces of substrate 62 are covered with light diffusing coating layers 64 may also be used, as shown in FIG. 6. Substrate 62 of FIG. 6 may include embedded light-scattering particles 66 to enhance light diffusion or particles 66 may be omitted from substrate layer 62.

Figure 7:
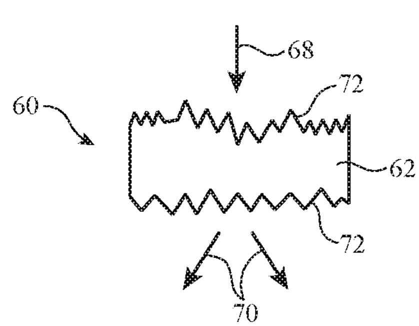
FIG. 7 is a cross-sectional side view of a light diffusing layer of with textured light-diffusing surface structures such as protrusions and/or depressions that diffuse light in accordance with an embodiment.

One or both of the surfaces of substrate 62 and/or the surfaces of coating layer(s) 64 may be textured to help enhance the light diffusing properties of diffuser layer 60. In the example of FIG. 7, substrate 62 has been provided with textured outwardly facing and textured inwardly facing surfaces 70. These surfaces are characterized by protrusions and recesses that create light-scattering structures. Textured light-scattering surface structures formed from protrusions and/or ridges may also be formed on inner and exterior surfaces of coating layers 64.

Diffuse light 70 may be spread over a relatively wide range of angles and may be characterized by a Lambertian distribution of intensity versus angle (as an example). This helps reduce the sensitivity of ambient light sensor 50 to variations in the angular orientation of ambient light sensor 50 with respect to sources of light in the environment surrounding device 10. Light that is spread at wide angles may, however, be spread too widely to be received by photodetectors 42, leading to a potential reduction in ambient light sensor sensitivity. To avoid sensitivity loss due to light diffusing by the light diffuser in ambient light sensor 50, a light collimator formed from one or more light-collimating layers may be incorporated into ambient light sensor 50. The light-collimating layers may help collimate diffused light 70 and thereby direct this light onto photodetectors 42 for measurement.

Figure 8:
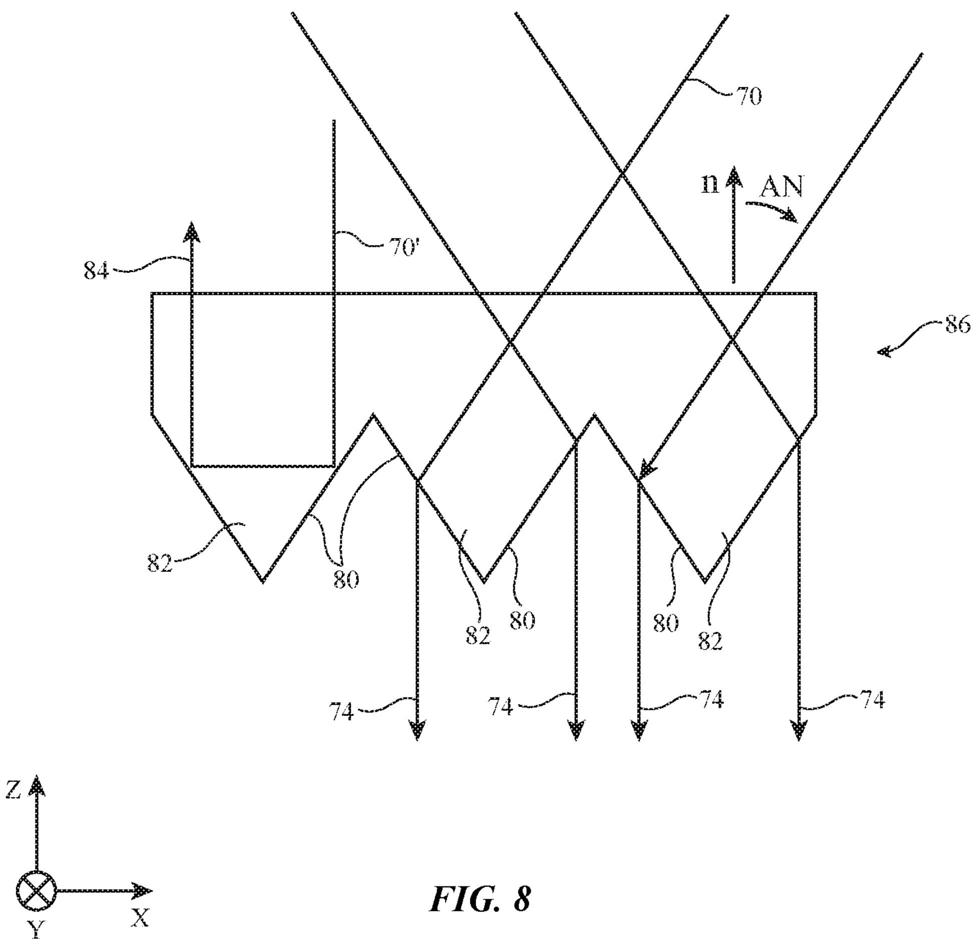
FIG. 8 is a cross-sectional side view of an illustrative light-collimating structure such as a layer with inwardly facing ridges with triangular cross-sectional profiles in accordance with an embodiment.

An illustrative light-collimating layer for ambient light sensor 50 is shown in FIG. 8. As shown in FIG. 8, light-collimating layer 86 may have downwardly facing (inwardly facing) protrusions 82. Light-collimating layers such as layer 86 of FIG. 8 may sometimes be referred to as brightness enhancement films. Protrusions 82 of layer 86 may have conical shapes, pyramidal shapes, may form ridges with curved and/or planar side surfaces, and/or other suitable shapes for refracting light downwardly parallel to the −Z direction of FIG. 8.

In the example of FIG. 8, protrusions 82 have the shape of parallel ridges. Protrusions (ridges) 82 extend into the page along the Y axis and are characterized by triangular cross-sectional ridges. Incoming diffused ambient light rays (light 70) may be characterized by non-zero angles AN with respect to surface normal n of the planar surface on the outwardly facing side of light-collimating layer 86. When these light rays reach angled surfaces 80 of the triangular ridges (protrusions 82) on the inwardly facing side of light-collimating layer, they will be refracted inwardly and will exit light-collimating layer 86 at a reduced angle with respect to surface normal AN (e.g., light 70 will be collimated along the −Z axis). This will enhance the amount of on-axis light that is received by photodetectors 42. Some diffused light rays may enter light-collimating layer 86 in a direction that is parallel or nearly parallel to the −Z axis (e.g., parallel to surface normal n). These rays, such as illustrative ray 70' of FIG. 8, will be reflected upwardly (outwardly) as illustrated by ray 84 due to the principal of total internal reflection. When back-reflected rays such as ray 84 reach the light-diffuser layer(s) 60, they will be diffused. For example, rays such as ray 84 may scatter inwardly from light-scattering particles 66. This allows at least some of rays 84 to be recycled, thereby enhancing the amount of ambient light reaching photodetectors 42.

Figure 9:
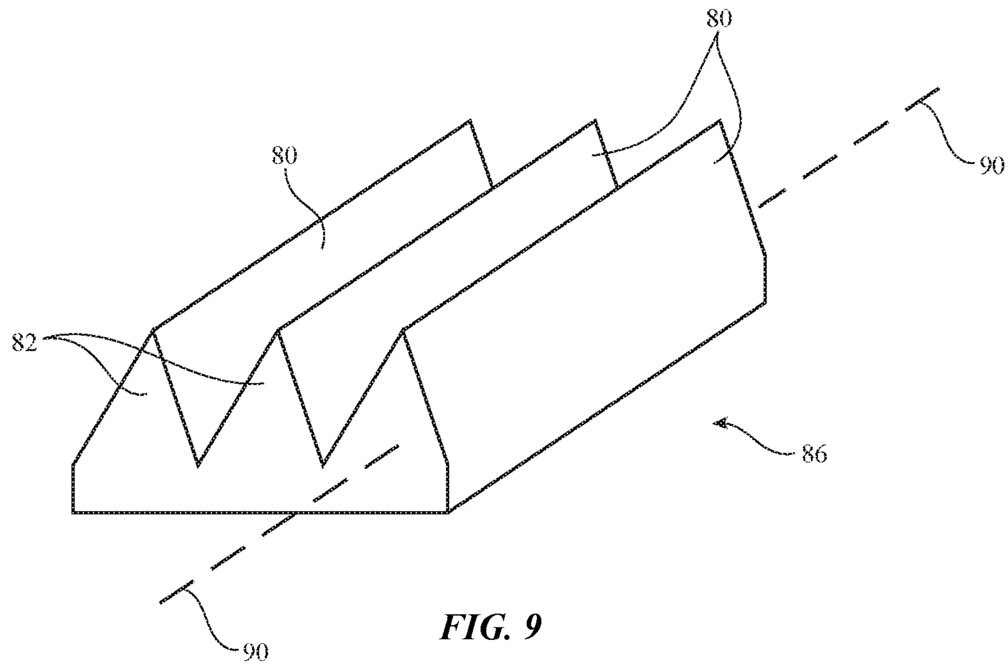
FIG. 9 is a perspective view of an illustrative light-collimating layer with triangular ridges in accordance with an embodiment.
Figure 10:
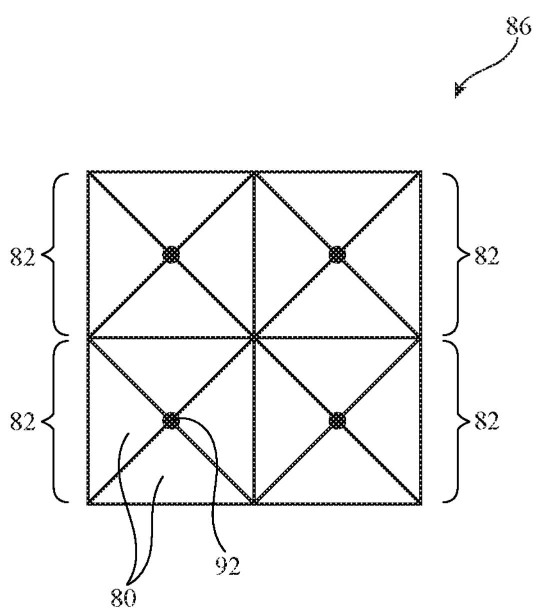
FIG. 10 is a top view of an illustrative light collimation layer formed from a two-dimensional array of protruding structures such as pyramidal structures in accordance with an embodiment.

FIG. 9 is a perspective view of light-collimating layer 86 in an illustrative configuration in which protrusions 82 are formed from a series of parallel triangular ridges (e.g., ridges with triangular cross-sectional profiles). Each triangular ridge in this type of configuration has an elongated shape that extends along longitudinal axis 90. FIG. 10 is a top view of an illustrative configuration for light-collimating layer 86 in which protrusions 82 have pyramidal shapes (each pyramid being characterized by four triangular planar surfaces 80 and a peak 92). Other protrusion shapes may be used for light-collimating layer 86, if desired (e.g., cones, rounded ridges, truncated cones, bumps and ridges of other shapes, etc.).

Figure 11:
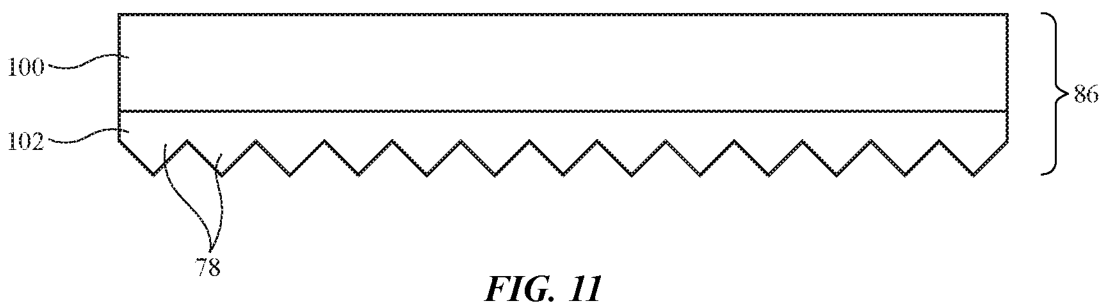
FIG. 11 is a cross-sectional side view of an illustrative light-collimating layer for an ambient light sensor in accordance with an embodiment.

As shown in the cross-sectional side view of light-collimating layer 86 of FIG. 11, layer 86 may, if desired, be formed from a textured coating on a substrate. A layer of light-collimating structures such as textured coating 102 may, for example, be formed on substrate 100. Substrate 100 may be a transparent layer of glass, polymer, and/or other transparent material and may have a planar shape (e.g., substrate 100 may be a polymer film). Substrate 100 may be separate from the layer(s) used in forming light diffusing layer 60 (see, e.g., FIGS. 4, 5, 6, and/or 7) or substrate 100 may include light diffusing substrate 62 and/or one or more coating layers 64 of light-diffusing layer 60. In this configuration, substrate 100 may serve both as light diffusing layer 60 and as a substrate for textured coating 102 (which may serve as a light collimating layer).

Textured coating 102 may be a clear polymer layer that is deposited as a liquid and cured to form a solid textured pattern such as the illustrative pattern of protrusions shown in FIGS. 9 and 10 and/or other suitable textured patterns of light-collimating protrusions. Textured coating 102 may be patterned as a partially cured (semisolid) polymer followed by additional curing operations (e.g., using ultraviolet light curing, thermal curing, etc.) to form a solid textured structure and/or may be patterned by embossing or otherwise patterning a solid polymer coating layer that has been cured on substrate 100 (e.g., textured coating 102 may be formed by pressing a textured drum or other patterning surface against a cured polymer coating layer). Other patterning techniques may be used for forming protrusions 82 in coating 102 if desired. Arrangements in which textured drums or other patterning tools are used to form the texture of textured coating 102 directly on substrate layer 100 may also be used.

Figure 12:
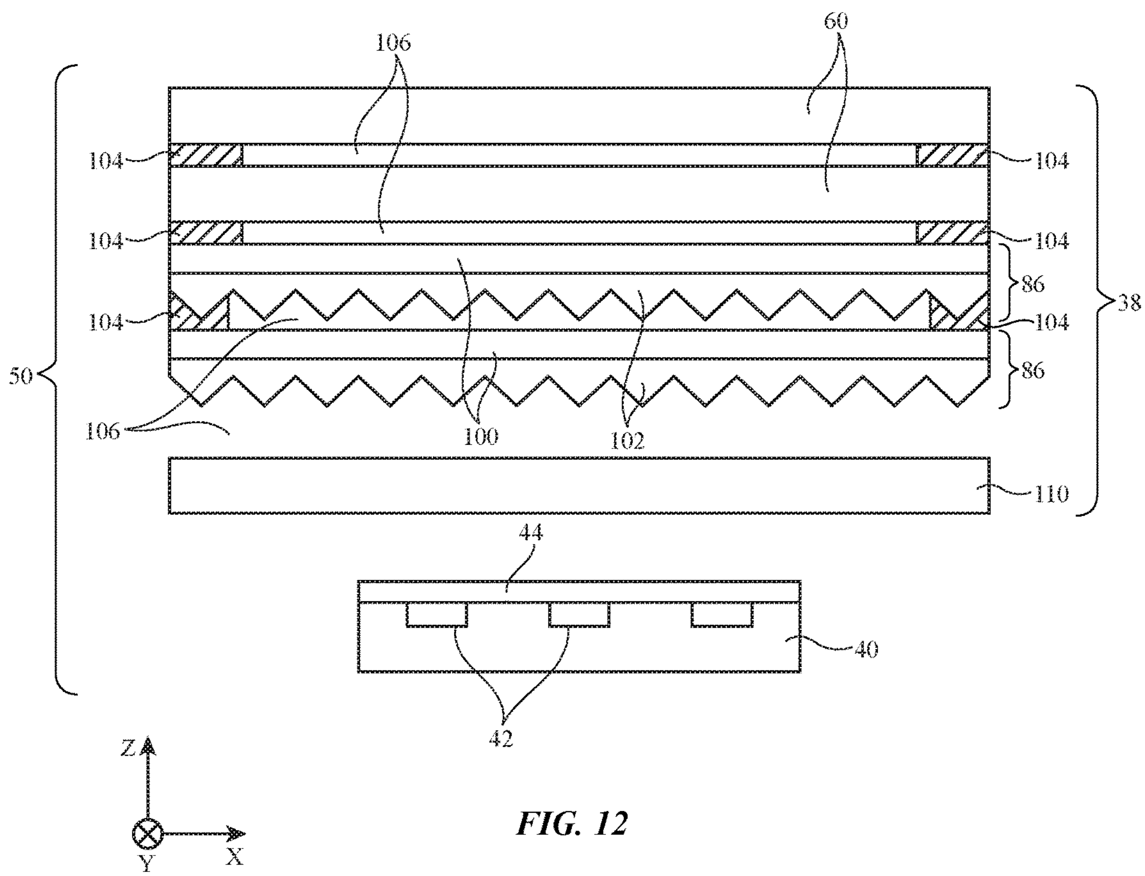
FIG. 12 is a cross-sectional side view of an illustrative ambient light sensor having a light diffuser with multiple light diffusing films and a light collimator with multiple light-collimating films in accordance with an embodiment.

FIG. 12 shows how ambient light sensor 50 may include a stack of optical layers 38 that are aligned with window 20 and light detector integrated circuit 40. Layers 38 may be separated by rings of adhesive 104 to create air gaps 106. The presence of air gaps 106 may allow light to diffuse and collimate when passing through light diffusing and light collimating layers in layers 38. Layers 38 may be mounted within a support structure such as support structure 36 of FIG. 3 and/or other suitable ambient light sensor support structures.

Optical layers 38 may include one or more light diffuser layers 60 such as light diffuser layers 60 of the type described in connection with FIGS. 4, 5, 6, and/or 7. In the example of FIG. 12, ambient light sensor 50 includes two light diffuser layers 60.

Optical layers 38 may include one or more infrared-light-blocking filter layers such as infrared filter 110. Infrared filter 110 may be formed from an infrared-light-blocking thin-film interference filter (e.g., a stack of dielectric layers of alternating refractive index) on a transparent substrate such as a layer of glass or plastic, and/or may include a bulk material that absorbs infrared light and that transmits visible light. Infrared-light-blocking filter layer(s) such as these may, if desired, be incorporated into a layer on light-detector integrated circuit 42 (e.g., interspersed within color filter layer 44, at the top of color filter layer 44, at the bottom of color filter layer 44, etc.).

One or more light-collimating layers 86 may be used in forming a light collimator that is included in optical layers 38 to help collimate incoming ambient light as described in connection with FIG. 8. In the example of FIG. 12, two light-collimating layers 86 (e.g., two brightness enhancement films) have been included in optical layers 38. Light-collimating layers 86 may be interposed between light-diffusing layers 60 and infrared-light-blocking filter 110 (e.g., layers 86 may be interposed between light-diffusing layers 60 and light detector integrated circuit 40). To receive light through window 20, light-collimating layers 86 may be aligned with optical window 20 (e.g., in alignment with light-diffusing layers 60, infrared-light-blocking filter 110, and light detector integrated circuit 40, etc.). When mounting layers 86 in device 10, layers 86 may be supported by support structures 36 (e.g., support structures 36 may surround the sides of light-collimating layers 86 as shown in FIG. 3).

Figure 13:
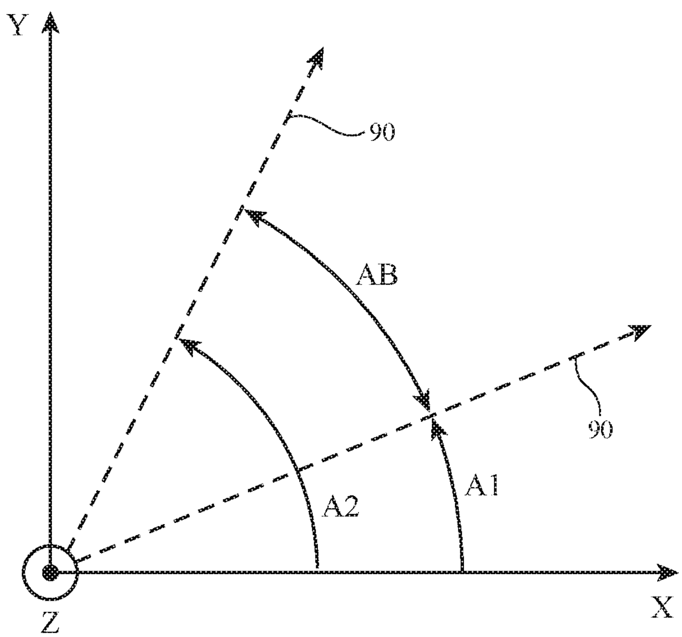
FIG. 13 is a diagram showing how light-collimating films in a multi-film ambient light sensor may be oriented at a non-zero angle with respect to each other in accordance with an embodiment.

To help collimate ambient light that is received through window 20 in a variety of different orientations, ambient light sensor 50 may have multiple light-collimating layers 86 each of which has a different orientation. For example, the first and second light-collimating layers 86 of FIG. 12 may each have inwardly facing ridges with triangular cross-sectional profiles as shown in FIG. 9 and may be oriented so that the ridges of the first layer are oriented at a non-zero angle with respect to the ridges of the second layer. The longitudinal axis 90 of the ridges in the first light-collimating layer 86 may be oriented at a non-zero angle A1 with respect to the X axis of FIG. 12 and the longitudinal axis 90 of the ridges in the second light-collimating layer 86 may be oriented at a non-zero angle A2 with respect to the X axis of FIG. 12. As shown in FIG. 13, the relative angular orientation of the longitudinal axes of the first and second layers may be a non-zero angle AB. The value of AB may be 10-90°, may be 20-85°, may be at least 30°, may be at least 45°, may be 40-70°, may be less than 90°, may be less than 75°, or may have any other suitable value. If desired, light-collimating layers 86 may have pyramidal protrusions, collections of ridges that are oriented in patches with different orientations, and/or other protrusions and/or recesses for collimating light. The use of triangular ridges in layers 86 is illustrative.

Figure 14:
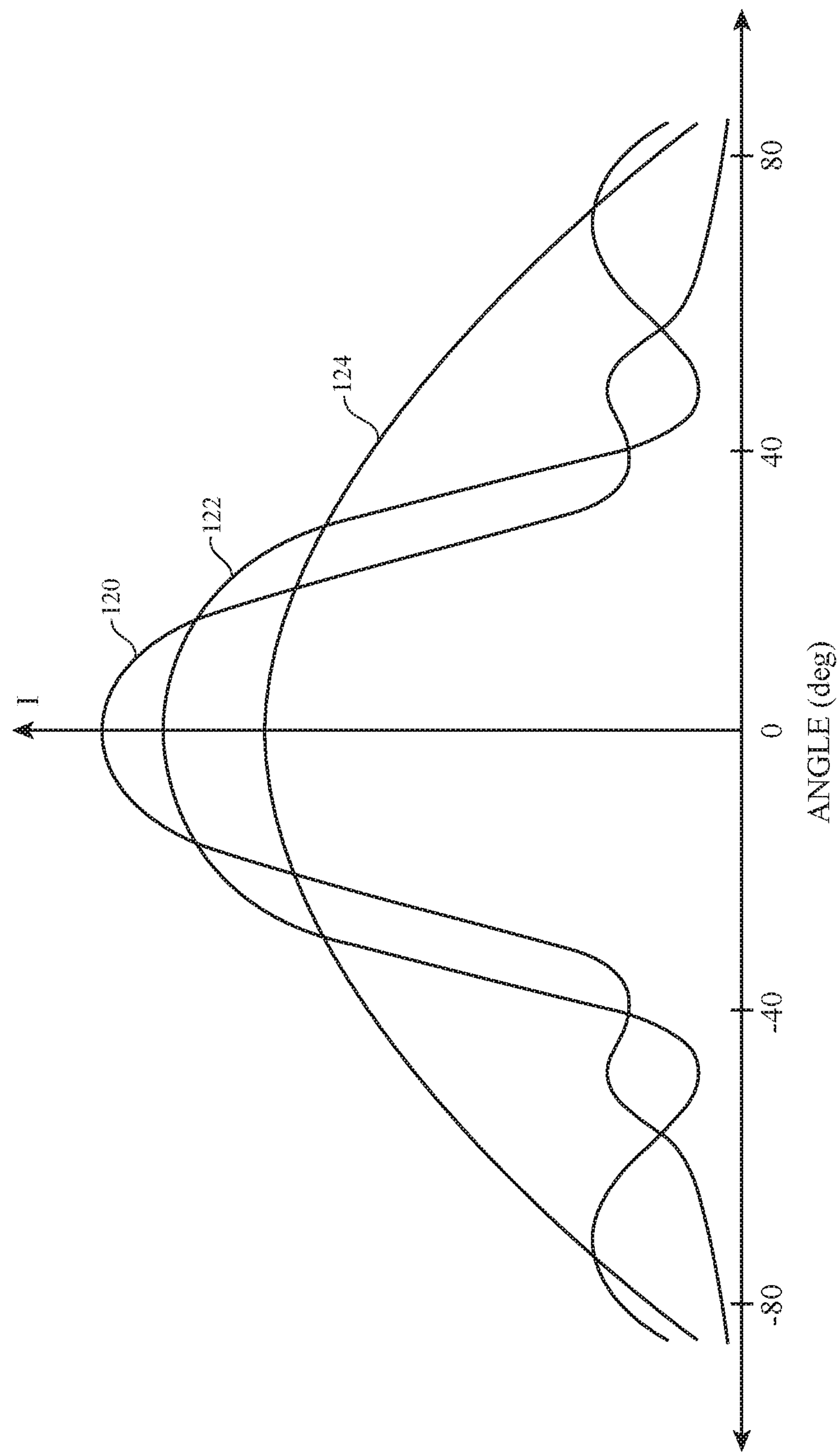
FIG. 14 is a graph in which incoming ambient light intensity has been plotted as a function of incoming ambient light ray orientation in the presence of different light collimation structures in accordance with an embodiment.

FIG. 14 is a graph showing how the intensity I of diffused ambient light 70 (e.g., light at an illustrative wavelength of 550 nm that is exiting light diffuser layers 60 with a Lambertian intensity distribution) may vary as a function of angle with respect to surface normal n (axis Z of FIG. 3) in three illustrative configurations for ambient light sensor 50.

In a first illustrative configuration, only light diffuser layers 60 are present and light-collimating layers 86 are omitted. The light intensity in this configuration is given by curve 124.

In a second illustrative configuration, a single light-collimating layer is present (e.g., the uppermost light-collimating layer 86 of FIG. 12). In this configuration, the light intensity of the light exiting the light-collimating layer is given by curve 122. Due to the collimation effect of the light collimating layer 86, the intensity of on-axis light is increased for curve 122 relative to curve 124.

In a third illustrative configuration, first and second stacked light-collimating layers are present (e.g., layers 86 of FIG. 12). In this configuration, the light intensity of the light exiting the light-collimating layer is given by curve 120. As shown in FIG. 14, the intensity profile of curve 120 is narrower than that of curve 122 (e.g., ambient light is more highly collimated and has an angular distribution that is more tightly concentrated about the Z axis when two light-collimating layers 86 are included in ambient light sensor 50).

Other light-collimating layer configurations may be used, if desired (e.g., configurations with three or more light-collimating layers, etc.). The configurations of FIG. 14 are shown as examples.

The foregoing is merely illustrative and various modifications can be made to the described embodiments. The foregoing embodiments may be implemented individually or in any combination.

What is claimed is:

1. An electronic device, comprising:

a display;

a color ambient light sensor; and control circuitry configured to adjust the display based on ambient light color and ambient light intensity information from the color ambient light sensor, wherein the color ambient light sensor comprises:

a light detector integrated circuit having a plurality of photodetectors;

a light diffuser; and a light collimator interposed between the light diffuser and the light detector, wherein the light collimator includes first and second light-collimating layers separated by an air gap.

2. The electronic device defined in claim 1 wherein the light diffuser comprises first and second light diffuser layers separated by an air gap.

3. The electronic device defined in claim 2 wherein the first light diffuser layer has a first transparent substrate and wherein the second light diffuser has a second transparent substrate.

4. The electronic device defined in claim 3 wherein the first light diffuser includes first light-scattering particles and wherein the second light diffuser includes second light-scattering particles.

5. The electronic device defined in claim 4 further comprising:

a first polymer coating on the first transparent substrate, wherein the first light-scattering particles are embedded in the first polymer coating; and a second polymer coating on the second transparent substrate, wherein the second light-scattering particles are embedded in the second polymer coating.

6. The electronic device defined in claim 4 wherein the first light-scattering particles are embedded in the first transparent substrate and wherein the second light-scattering particles are embedded in the second transparent substrate.

7. The electronic device defined in claim 3 wherein the first light diffuser includes textured light-scattering surface structures configured to diffuse light.

8. The electronic device defined in claim 1 wherein the display includes a display cover layer, the electronic device further comprising:

an opaque masking layer on a surface of the display cover layer in an inactive area of the display; and an ambient light sensor window formed from an opening in the opaque masking layer that is aligned with the color ambient light sensor.

9. The electronic device defined in claim 1 wherein the first light-collimating layer has triangular ridges extending along a first direction and wherein the second light-collimating has triangular ridges extending along a second direction that is different than the first direction.

10. The electronic device defined in claim 1 wherein the first light-collimating layer comprises a polymer coating layer on the light diffuser.

11. The electronic device defined in claim 10 wherein the light diffuser includes a substrate and wherein the polymer coating layer of the first light-collimating layer includes ridges with triangular cross-sectional profiles on the polymer substrate.

12. An electronic device, comprising:

a housing;

a display coupled to the housing, wherein the display has an ambient light sensor window; and an ambient light sensor in alignment with the ambient light sensor window, wherein the ambient light sensor comprises:

a light diffuser having at least one light-diffusing layer configured to diffuse ambient light passing through the ambient light sensor window as the ambient light passes through the light-diffusing layer;

a light collimator having at least one light-collimating layer configured to collimate the diffused ambient light; and a photodetector configured to receive the collimated diffused ambient light.

13. The electronic device defined in claim 12 wherein the light-diffusing layer has a transparent substrate that is separated by an air gap from the light collimator.

14. The electronic device defined in claim 12 wherein the light collimator comprises first and second light-collimating layers separated by an air gap.

15. The electronic device defined in claim 14 wherein the first light-collimating layer has first ridges and wherein the second light-collimating layer has second ridges.

16. The electronic device defined in claim 15 wherein the first ridges extend along a first direction and wherein the second ridges extend along a second direction that is different than the first direction.

17. An ambient light sensor, comprising:

a light-diffusing layer configured to diffuse ambient light;

a light collimator configured to collimate the diffused ambient light wherein the light collimator is a coating on the light-diffusing layer; and a photodetector configured to receive the collimated diffused ambient light.

18. The ambient light sensor defined in claim 17 wherein the light collimator has ridges that face the photodetector.

19. The ambient light sensor defined in claim 12 further comprising an infrared-light-blocking filter layer interposed between the light collimator and the photodetector.

20. The ambient light sensor defined in claim 19 wherein the light collimator and the light-diffusing layer are separated by an air gap.

21. The electronic device defined in claim 12, wherein the at last one light-collimating layer has ridges that face the photodetector.

* * * * *